Oct. 14, 1941.   P. W. R. SATROM   2,258,626
PACKER RIM ATTACHMENT FOR SEEDER DISKS
Filed July 31, 1940

Inventor
Philip W. R. Satrom
By Clarence A. O'Brien
Attorney

Patented Oct. 14, 1941

2,258,626

UNITED STATES PATENT OFFICE 2,258,626

PACKER RIM ATTACHMENT FOR SEEDER DISKS

Philip W. R. Satrom, Galesburg, N. Dak.

Application July 31, 1940, Serial No. 348,893

2 Claims. (Cl. 97—217)

This invention relates to a packer attachment for the disks of seeding machines, the general object of the invention being to provide a pair of rimmed disks for attachment to the hub of a seeder disk so that the rims of the attachment will prevent the disk from entering the ground beyond a certain point and said rims will pack the soil opposite the sides of the disk.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
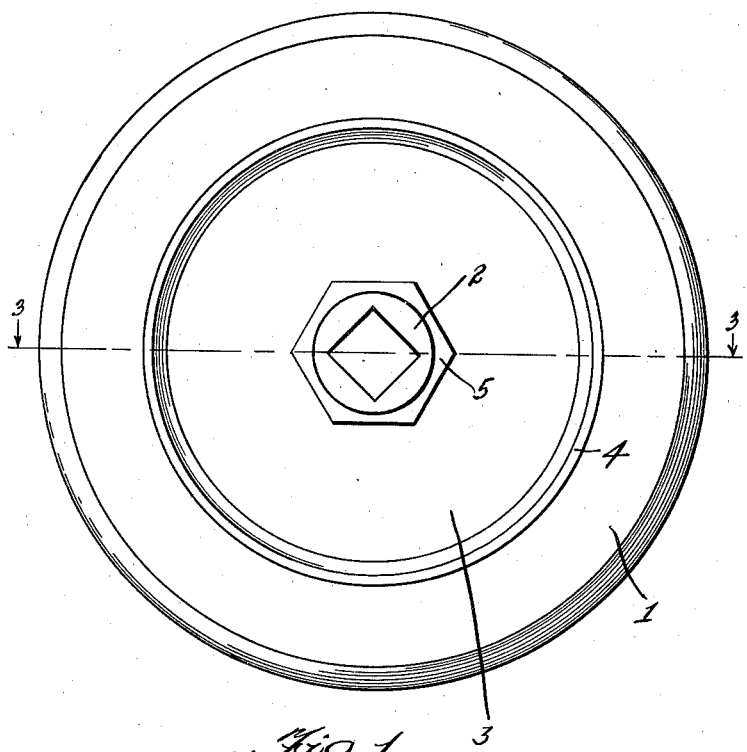
Figure 1 is a side view of the improved disk.
Figure 2:
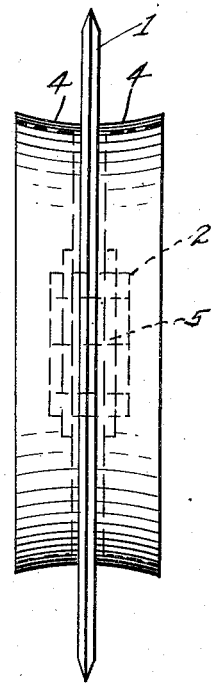
Figure 2 is an edge view thereof.
Figure 3:
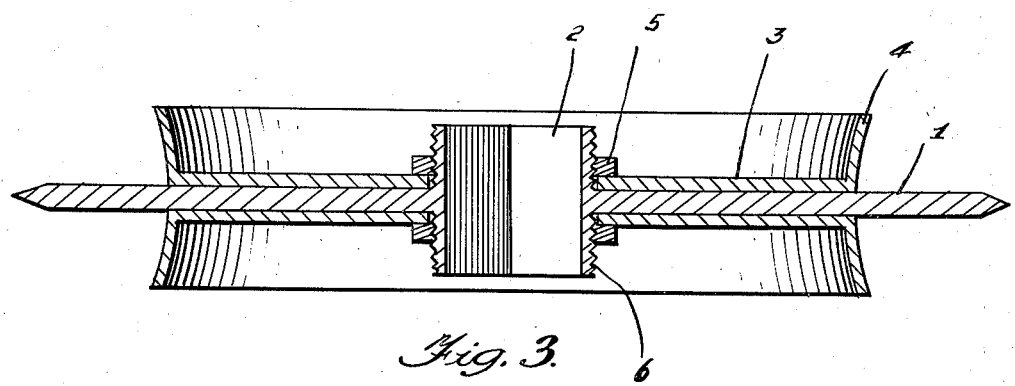
Figure 3 is a section on the line 3—3 of Figure 1.

In these views the disk is shown at 1 and its hub at 2 and in carrying out the invention I provide a pair of rimmed disks 3, one for each side of the disk 1 and each disk is provided with a flange 4 which curves outwardly and toward the outer circumference of the disk 1 as shown more clearly in Figure 3. These disks 3 lie against the sides of the disk 1 and are held in place by the nuts 5 which are threaded on the exterior part of the hub 2 which is provided with the thread 6 for this purpose. The rims 4 not only prevent the disk 1 from entering the soil too deeply but they will also tend to pack the ground and form a slight depression so that the seeds will be firmly held in the ground and this depression will act to collect moisture so that the seeds will germinate quickly. The rimmed disks 3 will be provided in different sizes so that the farmer can select the most desired size in accordance with the seeds to be planted. By making the rims curve outwardly there is less danger of the soil adhering thereto than if the rims were straight.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a disk for a seeder including a hub exteriorly threaded, a pair of rimmed disks of less diameter than the first-mentioned disk, one arranged on one side of the first-mentioned disk and the other on the opposite side with the rims extending outwardly and nuts threaded on the hub for holding the rimmed disks in place.

2. In a disk for a seeder including a hub exteriorly threaded, a pair of rimmed disks of less diameter than the first-mentioned disk, one arranged on one side of the first-mentioned disk and the other on the opposite side with the rims extending outwardly and nuts threaded on the hub for holding the rimmed disks in place, said rims curving outwardly and toward the outer periphery of the first-mentioned disk.

PHILIP W. R. SATROM.